April 1, 1924.

A. H. SWEET

BRAKE BAND

Filed Feb. 8, 1923

1,488,717

Inventor;
Alvin H. Sweet,
per N.W. Cerender
Attorney.

Patented Apr. 1, 1924.

1,488,717

UNITED STATES PATENT OFFICE.

ALVIN H. SWEET, OF LOS ANGELES, CALIFORNIA, ASSIGNOR, BY DIRECT AND MESNE ASSIGNMENTS, TO TITLE GUARANTEE AND TRUST COMPANY, TRUSTEE, OF LOS ANGELES, CALIFORNIA.

BRAKE BAND.

Application filed February 8, 1923. Serial No. 617,771.

*To all whom it may concern:*

Be it known that I, ALVIN H. SWEET, a citizen of the United States, residing at Los Angeles, in the county of Los Angeles and State of California, have invented a new and useful Brake Band, of which the following is a specification.

My invention relates to improvements in brake bands and particularly when they are housed or relatively inaccessible for relining. The objects of my improvement are, first, to provide a sectional lining that may be removed from or applied to a brake band without disassembling or removing it from its normal position; and, second, to afford facilities for renewing only a portion of the lining and for arranging portions according to their relative condition of wear.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the construction illustrated in the accompanying drawing, in which—

Figure 1:
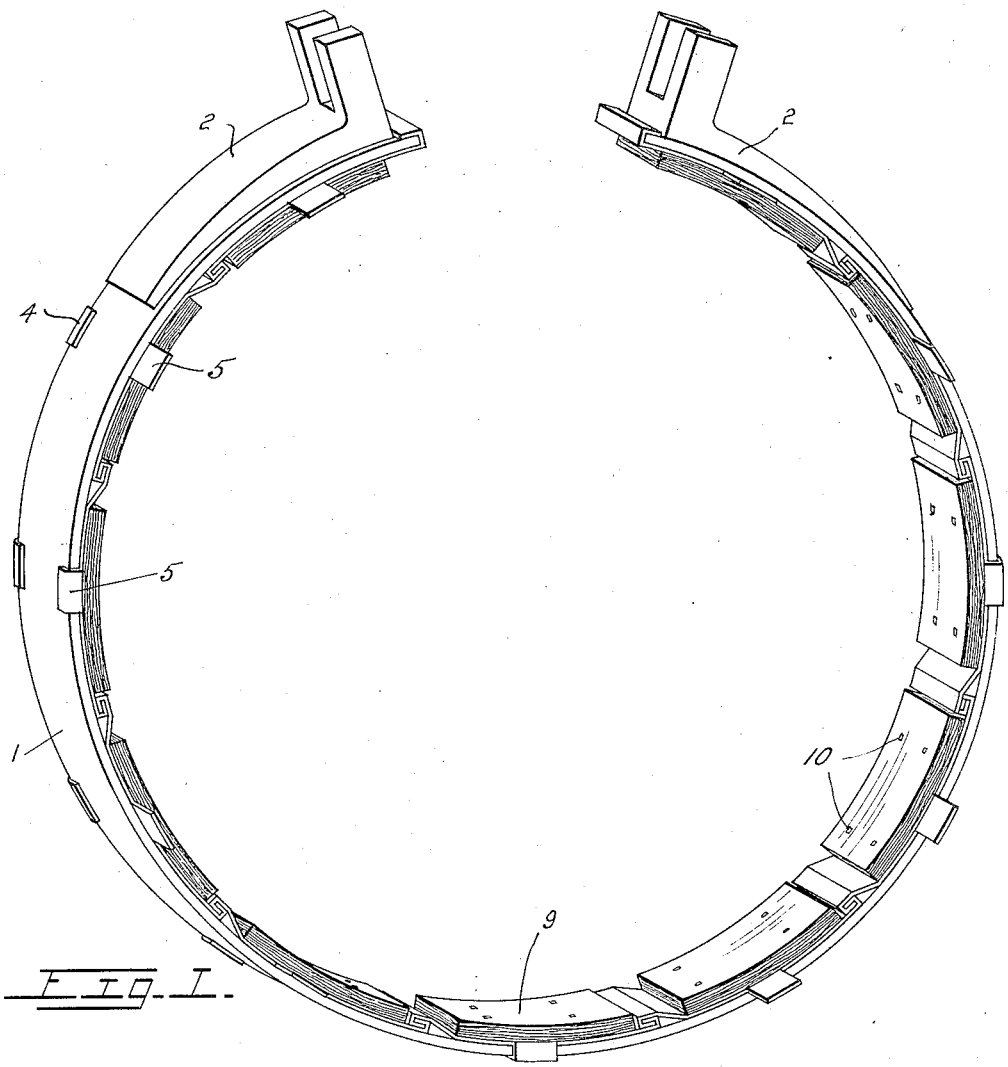
Figure 2:
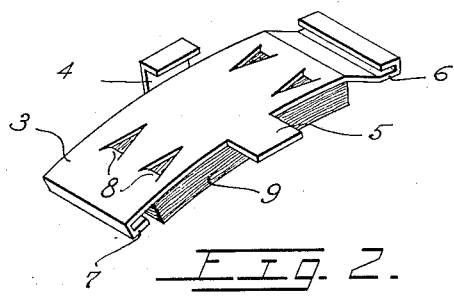

Figure 1 is a perspective view of my improved brake band, and Figure 2 is a similar enlarged view of one of the lining sections.

Similar numerals refer to similar parts throughout both views.

The brake band strap 1 may be of any usual and suitable form except that, where the width of end clips 2 is the same or nearly equal to the width of the strap, the inner edges of the latter should be chamfered adjacent the strap. This is to expose the edges of the strap near the ends to afford facilities for engagement by the lugs of the lining sections.

The lining, previous to assembly, comprises a plurality of interlocking sections formed substantially as shown in Fig. 2. Of these the backers 3 are preferably made of sheet steel with integral lugs 4 and 5. The former of these extends outwardly from the back, and is flanged at its outer end for engaging the edges of the strap. Lug 5 is formed in the plane of the back and of a length suitable for turning over the edge of the strap in assembling the brake band so as to correspond in shape to the opposite and previously formed lug 4. The folded ends 6 and 7 of the backers are adapted for engaging adjacent sections of the lining. The backers also have clinch points 8 pressed inwardly from the material of which they are formed, and friction material 9 is attached to the backers by means of these points as indicated in Fig. 1 at 10.

Flanges on lugs 4 and 5 are often superfluous and may be omitted. In such cases, after assembling, the lugs merely extend straight out from the backers, and serve only to keep the sections in place so far as movement parallel to the axis is concerned.

The lining sections may be added one at a time in assembling, or to replace defective sections at any time. They are slipped into the strap sideways, parallel to the axis. Worn sections of lining can be removed and placed in other positions if desired without disturbing the remaining portions of the lining. After placing, the flat lugs 5 are turned outwardly, and flanged over the strap if desired.

The construction and operation of the invention will be clear from the foregoing description. It will also be obvious that the lining is flexible and otherwise perfectly adapted for braking purposes.

In a previous application filed July 27, 1922, Serial Number 577935, which has matured into a Patent Number 1460118, June 26, 1923, and in companion applications filed coincidentally with this, I have shown somewhat similar brake band construction. No one of said applications however, claims what is claimed herein.

I claim;

1. A brake lining comprising a plurality of sections adapted by transverse sliding for mutual hooked engagement and for engaging a brake strap.

2. A brake lining comprising a plurality of sections adapted by transverse sliding for mutual hooked engagement and for engaging the edge of a brake strap for alignment therewith.

3. A brake lining comprising a plurality of sections adapted for mutual engagement and for engaging the edge of a brake strap by transverse sliding; each of said sections having a lug adapted for bending around the other edge of said strap for maintaining alignment therewith.

4. In combination, a brake band; a lining comprising a plurality of sections adapted for mutual engagement and for engaging the edge of said band for alignment therewith by transverse sliding; each of said sections having a lug adapted for bending around the other edge of said strap for maintaining alignment therewith.

ALVIN H. SWEET.